US008810377B2

(12) United States Patent
Bergmeier et al.

(10) Patent No.: US 8,810,377 B2
(45) Date of Patent: Aug. 19, 2014

(54) PORTABLE, IN PARTICULAR MEDIA-ENABLED CONSOLE

(75) Inventors: Heinz Bergmeier, München (DE); Anna Grusczyk, München (DE); Ramona Haberkamm, Traunreut (DE); Tanja Haberlander, München (DE); Markus Theine, Grabenstätt (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 154 days.

(21) Appl. No.: 13/318,811

(22) PCT Filed: Apr. 29, 2010

(86) PCT No.: PCT/EP2010/055837

§ 371 (c)(1),
(2), (4) Date: Nov. 4, 2011

(87) PCT Pub. No.: WO2010/130587

PCT Pub. Date: Nov. 18, 2010

(65) Prior Publication Data

US 2012/0056732 A1 Mar. 8, 2012

(30) Foreign Application Priority Data

May 15, 2009 (DE) ........................ 10 2009 003 134

(51) Int. Cl.
*G05B 11/01* (2006.01)
*G08C 17/00* (2006.01)
*F24C 7/08* (2006.01)

(52) U.S. Cl.
CPC ................ *F24C 7/082* (2013.01); *G08C 17/00* (2013.01)
USPC .................... 340/12.54; 340/15.52; 340/12.5; 340/8.1; 340/539.1; 340/539.13; 340/426.13; 340/426.18

(58) Field of Classification Search
USPC ............... 340/12–54, 12.52, 12.5, 8.1, 539.1, 340/539.13, 426.13, 426.18
See application file for complete search history.

(56) References Cited

U.S. PATENT DOCUMENTS

| | | | | |
|---|---|---|---|---|
| 6,198,079 | B1 | 3/2001 | Essig | |
| 6,563,430 | B1 * | 5/2003 | Kemink et al. | 340/8.1 |
| 6,744,364 | B2 * | 6/2004 | Wathen | 340/539.1 |
| 2007/0293190 | A1 | 12/2007 | Ota | |

FOREIGN PATENT DOCUMENTS

EP 0846991 B1 6/1999

OTHER PUBLICATIONS

International Search Report PCT/EP2010/055837.

* cited by examiner

*Primary Examiner* — Tai T Nguyen
(74) *Attorney, Agent, or Firm* — James E. Howard; Andre Pallapies

(57) ABSTRACT

A portable console includes at least one control and display unit, and at least one communication interface for communicating within a predefined range of functions with at least one household appliance. The range of functions includes a plurality of functional areas which are dependent on and limited by a distance of the console from the household appliance.

19 Claims, 2 Drawing Sheets

PORTABLE, IN PARTICULAR MEDIA-ENABLED CONSOLE

BACKGROUND OF THE INVENTION

The invention relates to a portable, in particular media-enabled console having at least one control and display unit and at least communication interface for communicating within a predefined range of functions with at least one household appliance.

In the household appliance sector it is known for controlling a household appliance to also use external, i.e. portable, display and control units, what are known as portable consoles, to control and display the state of the relevant household appliance.

The present invention is based on the object of configuring a console of the type mentioned in the introduction such that in the case of external use of the console, with respect to the control and display functions which can be technically performed between console and household appliance, the security of operation thereof and therewith the operational safety of the relevant household appliance in each case as well as ease of use and advanced functions are improved by the media-enabled capacity of the console.

BRIEF SUMMARY OF THE INVENTION

This object is achieved according to the invention in a portable, in particular media-enabled console of the type mentioned in the introduction in that the range of functions comprises a plurality of functional areas dependent on and limited by the distance of the console from the household appliance.

Some of the terms used in the above-stated solution to the posed object are defined as follows:

Console: electronic display and/or control device which comprises, preferably wirelessly and/or wired, at least one communication interface for communication with at least one household appliance and/or another communication device, for example a PC or the like, for example by means of infrared radiation, online or offline, and can be used independently of location of the appliance communicating therewith, i.e. externally as well.

Function: all manually controllable and visually and/or acoustically displayable process data relevant to operation of the respective household appliance, such as start of process, end of process, time, duration, temperature, etc.

Household appliance: all electrical devices which can be used in a household, such as, in particular, cooking appliances, ovens, cooktops or refrigerators, dishwashers or the like.

Media-enabled capacity is in particular taken to mean the ability to display and influence digital media as well as communication with other digital media.

A communication system is created by the invention which allocates the, in particular externally used, display and/or control device, i.e. the console, functions limited by distance in support of the operational and monitoring safety of the household appliance being communicated with in each case as well as in support of improved control of the household appliance. Operating errors which are not spontaneous and can be identified as such are therefore largely prevented, for example switching on a hotplate or a cooktop, without a saucepan being stood thereon, which would not have happened in the case of visual contact with the cooktop. The invention deals with configuring the functionality of an external console so as to be dependent on the respective distance of the console from the relevant household appliance in such a way that, according to claim 5, the range of functions thereof decreases from one distance zone to another distance zone more remote from the household appliance.

The safety aspect is especially promoted in this connection if provided as distances limiting the functional areas are ranges with visual contact on the one hand and ranges without visual contact on the other hand between console and therewith user and household appliance.

In this sense it is particularly expedient according to a further embodiment of the invention if provided as functional areas are a close range with completely identifiable appliance state, a visual range with incompletely identifiable appliance state and a home range outside of the visual range.

With a view to the completion of the usability of the inventive console a remote range without direct communication contact with the household appliance may be provided. A residual functionality is assigned to the console in this connection, for example with respect to communication with the electrical communication media/devices such as cell phones and PCs, which are in turn able to communicate with the console and the household appliance.

BRIEF DESCRIPTION OF THE DRAWINGS

The invention is described hereinafter with reference to exemplary embodiments illustrated in the drawings, in which.

DETAILED DESCRIPTION OF EXEMPLARY EMBODIMENTS OF THE PRESENT INVENTION

Figure 1:
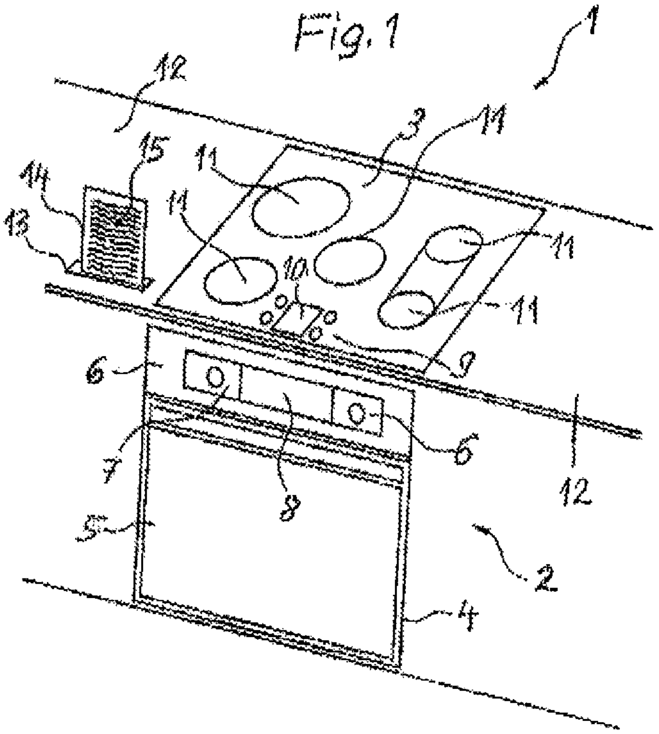
FIG. 1 shows a kitchen unit with an oven, cooktop and a portable console inserted in a docking station.

FIG. 1 shows a row of kitchen units 1 in which an electric stove 2 is fitted. The stove 2 comprises a cooktop 3 and an oven 4. At the front the oven 4 comprises an oven door 5 and an operating panel 6, with control or actuating elements 7 (such as rotary knob, switch, pushbutton, etc.) and a display element 8, for example an LED display or even a printed section relating to operation of the oven 4, being arranged in the operating panel. The cooktop 3 can be operated by way of example using touch buttons 9 and a display panel 10 which are arranged here on a cooktop panel made of glass or glass ceramic. The cooktop 3 comprises five different cooking zones 11 here of which the two cooking zones arranged on the right in this view are used as a joint warming zone. A connecting station or docking station 13 is let into an adjacent work surface 12 and is used for receiving a portable and media-enabled console 14. The console 14 can be supplied with power by means of the docking station 13 and can also exchange data without the docking station. On one side the console 14 is equipped with a screen, preferably a touch screen 15. The stove 2 can be operated by means of the console or the console 14 can be used for displaying media content and/or process states of the household appliance. The oven has a muffle which can be heated by electrical heaters such as top heat, bottom heat, grill heating elements and/or convention heating to carry out a cooking process, or can be operated by means of microwaves. The oven as well as the cooktop 3 has a controller, arranged for example in the plane of the operating panel 6, for this purpose which can communicate electronically with the electronic devices of the console 14.

Figure 2:
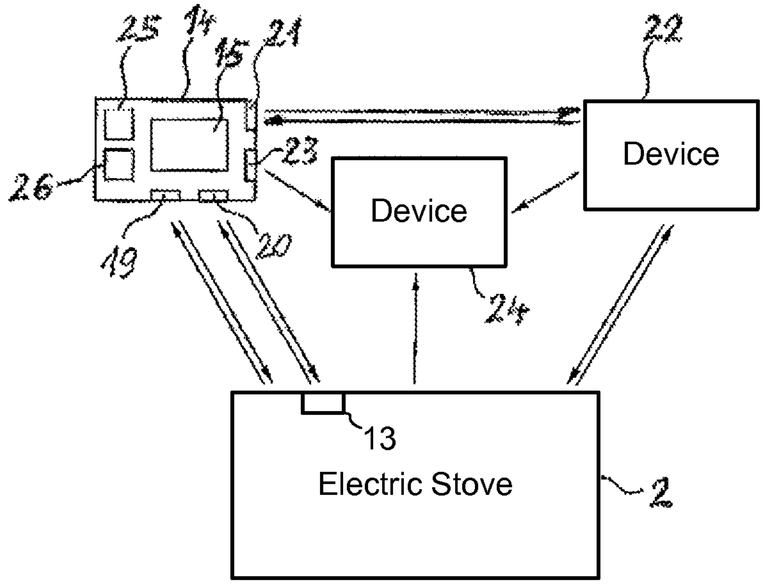
FIG. 2 shows a circuit diagram-like illustration of the communication channels between the console and a household appliance or with other appliances.

FIG. 2 schematically outlines communication channels between the console 14 and other appliances, which are indicated by the arrows in the appropriate direction. In detail, the console 14 in this exemplary embodiment can have two communication interfaces 19, 20 of which the first communication interface 19 is wireless and the second communication interface 20 is wired. These two interfaces 19, 20 are used for bidirectional communication with the stove 2 and/or another household appliance or other device, for example a PC. The wired interface 20 can, by way of example, be provided for insertion in the docking station 13. The wireless interface 19 is used for communication, for example with the stove 2, in particular in the case where the portable console 14 has been removed from the docking station 13. The wireless communication interface 19 can be any suitable wireless interface. The console 14 comprises a further interface 21 for communication with a device 22 which is not a household appliance. Such a device 22 can, by way of example, be a personal computer or even a mobile communications device such as a cell phone or the like. The console 14 also comprises a further interface 23 for unidirectional data transfer to yet a further device 24. The further device 24 can in particular be an additional screen which is larger or can be provided with a higher resolution than the touch screen 15 of the console 14. This screen can for example be secured to a household appliance. The stove 2 may by way of example be equipped in such a way that it can communicate directly with the device 22 and/or device 24. The device 22 may also communicate directly with device 24. Communication of the console 14 with a plurality of external devices 2, 22, 24 can also occur via a number of interfaces which differs from the number of communicatively coupled devices 2, 22, 24, wherein in an extreme case only one, in particular wireless, interface for communication with one or more devices exists or is required. Generally wireless or wired communication channels may be provided or used as required.

The console 14 also comprises a control unit 25 and a memory 26, it being possible for the memory 26 to be read and/or written to by the control unit 25, by way of example a microcontroller. Programs for controlling the stove 2 may also be stored in the memory unit 26. For a more user friendly display a content of the touch screen 15 may be depicted via the communication interface 23 on a device 24 which is designed as a larger screen, or on a monitor of a device 22 designed as a PC. Inputs may also be made on the PC analogously to an input on the touch screen 15.

For operation of the stove 2 the touch screen 15 can work as a remote control and display unit, i.e. functionally replicate for example the operating elements 7 and 9 and display panels 8 or 10. A food preparation program for example can be run interactively in particular via the console 14. Operation of the chosen household appliance, for example the stove 2, can be controlled via the console 14, for example by way of a previous setting of the temperature profile, or a setting adjusted during the operating procedure, or an output of the heating elements of the oven 4 or the heat settings of the cooktop 3.

Figure 3:
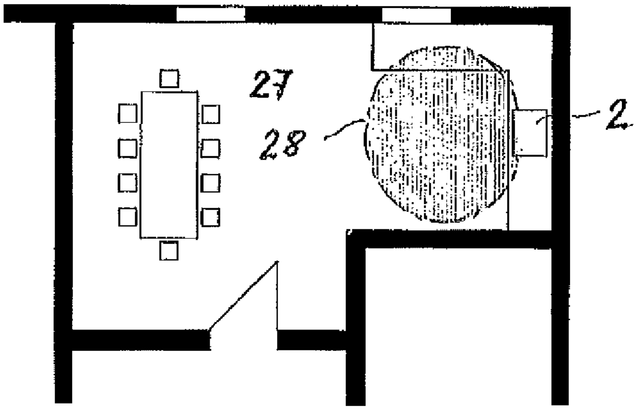
FIGS. 3 to 5 show different functional areas of the console with the aid of physical distances within and outside of a combined kitchen/living room between a household appliance and a console.
Figure 4:
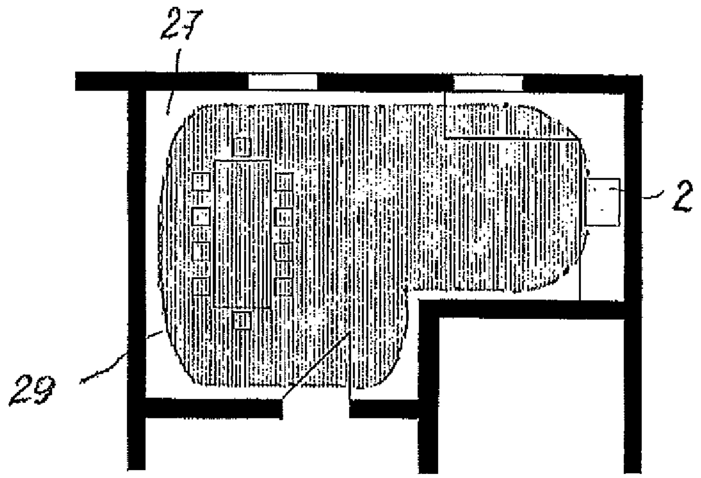
Figure 5:
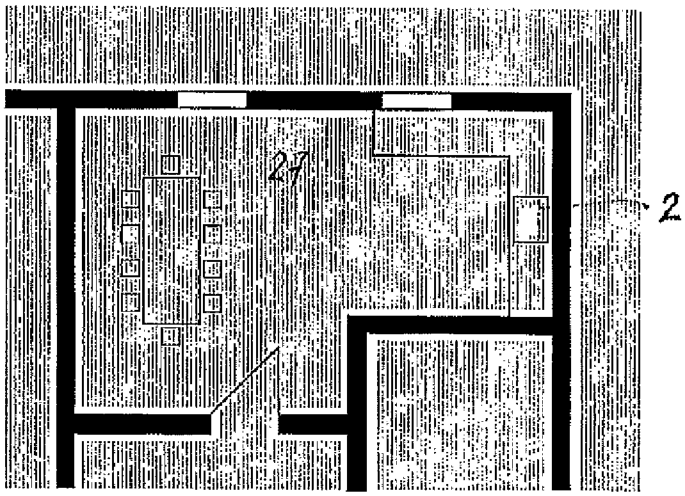

The monitoring and actuating options inherent to the console 14 are illustrated with the aid of FIGS. 3 to 5 using the example of a stove 2 permanently installed in a kitchen space 27.

In FIG. 3 the person dealing with the cooking process is located together with the console 14 removed from the docking station 13 in a close range 28 of the stove 2 indicated by dot-dash lines. The person can identify the appliance state of the stove 2, optionally including its control and display organs, in this close range 28. In this functional area 28 the person is close to the stove 2 and has the option of controlling and regulating all functions of the stove 2, for example setting process temperatures and switching on the appliance, by means of the console 14 by using its control unit 25 (FIG. 2). The corresponding process data are depicted on the touch screen 15.

In FIG. 4 the person is still located with the console 14 in the kitchen space 27 but at a greater distance from the stove 2 within a visual range 29. The person can accordingly incompletely identify the appliance state, in particular as regards the control and display organs of the stove 2. Only limited functions may be implemented via the console 14 here, for example switching off the stove 2 or reducing the process temperature.

In FIG. 5 the person with console 14 is located in a home range outside of the kitchen space 27, i.e. outside of the visual range of the stove 2. From here no control commands can be directly transmitted to the stove 2 by means of the console 14, instead only the current process data can still be seen on the touch screen 15, for example by means of a camera, and monitored, for example controlled. Prompt, personal intervention is possible when incorrect settings or malfunctions are identified.

There may still be the possibility of establishing contact with a communications device 22 (FIG. 2), for example a PC, from a remote range, for example remote from the kitchen space 27 or home via the console 14 of via other means of communication, for example a cell phone, offline. A recipe by way of example can be transferred for example from the Internet to the console 14 in this remote range and optionally modified in accordance with individual wishes. In the home range (FIG. 5) these data can be transmitted to the stove 2 and the process can then be started in the close range 28. The household appliance can in turn be switched off in the visual range 29.

The invention claimed is:

1. A portable console, comprising:

at least one control and display unit; and at least one communication interface for communicating within a predefined range of functions with at least one household appliance, wherein the range of functions comprises a plurality of functional areas dependent on and limited by a distance of the console from the household appliance, and wherein the at least one control is programmed to control the portable console such that a range of safety-relevant operational control of the household appliance by the portable console decreases as the distance of the portable console from the household appliance increases.

2. The console of claim 1, constructed in the form of a media-enabled console.

3. The console of claim 1, wherein the distance limiting the functional areas is based on a member selected from a group consisting of a range with visual contact and a range without visual contact between the console and user, on one hand, and the household appliance, on the other hand.

4. The console of claim 3, wherein the functional areas include a member selected from a group consisting of a close range with completely identifiable appliance state, a visual range with incompletely identifiable appliance state, and a home range outside of the visual range.

5. The console of claim 1, further comprising a remote range without direct communication contact with the household appliance.

6. The console of claim 1, wherein the range of functions in the functional areas includes:

a) close range allowing a complete control of the household appliance;

b) visual range allowing restricted control of the household appliance, c) home range allowing a display of at least one of an operating state and a setting of the household appliance, and d) remote range allowing a communication with third parties, communication devices able to communicate with the household appliance.

7. The console of claim 6, wherein the close range involves safety-relevant control of the household appliance.

8. The console of claim 6, wherein the safety-relevant control includes performance-reducing control of the household appliance.

9. The console of claim 1, wherein the at least one control is programmed to control the portable console such that the range of safety-relevant operational control of the household appliance by the portable console decreases as the distance of the portable console from the household appliance increases from:

a first distance range to a second distance range, wherein the second distance range is a greater distance from the household appliance than the first distance range;

the second distance range to a third distance range, wherein the third distance range is a greater distance from the household appliance than the second distance range; and the third distance range to a fourth distance range, wherein the fourth distance range is a greater distance from the household appliance than the third distance range, wherein the first distance range is a range with visual contact to the household appliance such that a state of operation of the household appliance is completely visually identifiable, wherein the second distance range is a range with visual contact to the household appliance such that the state of operation of the household appliance is incompletely visually identifiable, and wherein the third distance range is a range outside of visual contact with the household appliance such that the state of operation of the household appliance is not visually identifiable.

10. The console of claim 9, wherein the fourth distance range is a remote range without direct communication with the household appliance.

11. The console of claim 9, wherein the at least one control is programmed to control the portable console such that the range of safety-relevant operational control of the household appliance by the portable console includes:

a complete safety-relevant operational control of the household appliance in the first distance range;

a restricted safety-relevant operational control of the household appliance in the second distance range; and no safety-relevant operational control of the household appliance in the third distance range.

12. The console of claim 11, wherein the at least one control is programmed to control the portable console such that the range of safety-relevant operational control of the household appliance by the portable console does not include safety-relevant operational control of the household appliance in the fourth distance range.

13. The console of claim 11, wherein the at least one control is programmed to control the display to display at least one of a safety-relevant operating state and a safety-relevant setting of the household appliance in the third distance range.

14. The console of claim 11, wherein the at least one control is programmed to control the at least one communication interface to communicate with one or more additional communication devices configured to communicate with the household appliance.

15. The console of claim 1, wherein the portable console is a console for a household cooking appliance.

16. A portable console for operating a household appliance, comprising:

at least one communication interface to provide a communication between the portable console and the household appliance and to allow a user to input a control command for operating the household appliance within a predefined range of functions, and at least one control and display unit responsive to the input by the user and display of a selected one of the range of functions;

wherein the range of functions that the user is able to input is dependent on a distance of the portable console from the household appliance, and wherein the at least one control and display unit is programmed to control the portable console such that a range of safety-relevant operational control commands that area able to be communicated to the household appliance by the portable console decreases as the distance of the portable console from the household appliance increases.

17. The console of claim 16, wherein the distance is defined by a range with visual contact between the portable console and user, on one hand, and the household appliance, on the other hand, and a range without visual contact between the portable console and user, on one hand, and household appliance, on the other hand.

18. The console of claim 17, wherein the range with visual contact includes a close range which permits complete identification of an appliance state and full safety-relevant operational control of the household appliance, a visual range which provides only incomplete identification of the appliance state, thereby restricting the range of functions under the control of the user, and a home range which is outside of the visual range, thereby prohibiting any input of safety-relevant operational control commands.

19. The console of claim 16, further comprising a remote range without direct communication contact with the household appliance to allow transmission of data for display by the control and display unit.

* * * * *